United States Patent [19]

Van Heteren et al.

[11] 4,456,627

[45] Jun. 26, 1984

[54] POLYGLYCEROL ESTERS

[75] Inventors: Jan Van Heteren; Cornelis Poot, both of Vlaardingen; Freek Reckweg, Rotterdam, all of Netherlands; Murray F. Stewart, Bedford, England

[73] Assignee: Lever Brothers Company, New York, N.Y.

[21] Appl. No.: 397,279

[22] Filed: Jul. 12, 1982

[30] Foreign Application Priority Data

Jul. 15, 1981 [NL] Netherlands ............................ 8103356

[51] Int. Cl.³ .......................... A23D 3/00; A23D 5/00
[52] U.S. Cl. ...................................... 426/603; 426/604; 426/607
[58] Field of Search ............... 426/603, 604, 611, 612; 260/410.6

[56] References Cited

U.S. PATENT DOCUMENTS

| 3,415,658 | 12/1968 | Cunningham et al. | 426/612 |
| 3,637,774 | 1/1972 | Babayan et al. | 260/410.6 |
| 3,751,265 | 8/1973 | Seiden | 426/611 |
| 4,016,302 | 4/1977 | Kattenberg et al. | 426/607 |
| 4,055,679 | 10/1977 | Kattenberg et al. | 426/607 |

FOREIGN PATENT DOCUMENTS

| 1025265 | 4/1966 | United Kingdom . | |
| 1458568 | 12/1976 | United Kingdom | 426/611 |
| 1516374 | 7/1978 | United Kingdom | 426/612 |

Primary Examiner—Robert A. Yoncoskie
Attorney, Agent, or Firm—Milton L. Honig; James J. Farrell

[57] ABSTRACT

New polyglycerol fatty acid compositions wherein the polyglycerol moiety predominantly consists of di-, tri- or tetraglycerol, the fatty acid residues have a chain length of 16–18 carbon atoms and are substantially fully saturated and the degree of esterification ranges from 80 to 100%. Said compositions are particularly useful for producing margarines and low-fat spreads having improved butter-like properties and a reduced tendency to develop graininess.

5 Claims, No Drawings

POLYGLYCEROL ESTERS

The present invention relates to new polyglycerol fatty acid ester compositions and their use in producing fat blends, particularly margarine and low-fat spreads having improved butter-like properties and a reduced tendency to develop graininess.

By butter-like properties is understood a plasticity and elasticity which substantially correspond to those of natural butter. These properties and their measurement are described in J. Dairy Research 8, 245 (1937) Davies, J. C.; The British Food Manufacturing Ind. Res. Ass. The Rheology of Margarine and Compound Cooking Fats, part. I (Res. Rep. 37) and part II (Res. Rep. 69), 1956 van Prentice, J. H.

By graininess is understood the development of triglyceride conglomerates which have a melting point which can be as high as 25° C. and dimensions exceeding about 30 microns. These triglyceride conglomerates consist mainly of mixed crystals of triglycerides which may comprise any of the following combinations:

POP/PPO; POP/OPO; POS/OPO; POS/OSO, POP/OSO; SOS/OPO; MOS/OPO; SOS/OSS; POP/SPO; SOS/PSO; MPM/PMP; MSM/SMS; $C_{10}MM/MC_{10}M$; PPP/OPO; PPP/PPO; PPP/POP, in which P stands for palmitic acid, O stands for oleic acid, S stands for stearic acid and M stands for myristic acid.

Fat (blends) which are prone to graininess are mainly palm-based fats, e.g. palm oil, hydrogenated palm oil, interesterified palm oil and/or fractions thereof. Examples of such fat blends are described in U.S. Pat. Nos. 4,016,302 and 4,055,679.

The above-described conglomerates give an unpleasant feeling on the tongue and influence the hardness, appearance and stability of fat blends containing such and margarines produced therefrom. Development of graininess is dependent on the temperature at which fat blends prone to graininess and margarines produced therefrom are stored. At storage temperatures higher than 20° C., development of graininess will be hardly observed, whereas at temperatures ranging from 5° to 18° C. development of graininess will be perceivable.

The polyglycerol ester compositions according to the invention comprise:
(i) a polyglycerol moiety consisting for 50-100% of di-, tri- or tetraglycerol, 0–40% of penta- or hexaglycerol and 0–10% of hexaglycerol or higher polymers;
(ii) fatty acid residues comprising 18 and/or 16 carbon atoms and having an iodine value not exceeding 10;
and have
(iii) a degree of esterification ranging from 80 to 100%.

Dutch patent application 284 003 describes a process for producing polyglycerol fatty acid esters and the use of said compounds in cake batters, confectioneries and sugar-icing.

Polyglycerol esters derived from saturated fatty acids are reported to be useful for creams and ointments.

Polyglycerol esters derived from partially hydrogenated oils or partially hydrogenated fatty acids or mixtures thereof with saturated fats or fatty acids are reported to be useful as emulsifiers in vegetable fats and margarines.

Polyglycerol esters derived from liquid oils or unsaturated fatty acids are reported to be useful emulsifiers for ice-cream.

The polyglycerol esters described in the above patent specifications do not meet the combination of features (i), (ii), and (iii) of the selected polyglycerol esters used in the fat blends according to the invention, which makes them particularly useful for the purpose of the present invention, i.e. inhibition of graininess development and improvement of butter-like properties.

The preferred new polyglycerol fatty acid ester compositions according to the invention have a degree of esterification preferably ranging from 90 to 100%. The fatty acid residues are preferably fully saturated and preferably consist predominantly of palmitic acid residues. Ideally 80 to 100% of the fatty acid residues consist of palmitic acid.

Applicants have found that for the purpose of the present invention the fatty acid residues in the polyglycerol fatty acid esters should have a great similarity with the fatty acid residues present in high proportions in fats, i.e. they should have a chain length of 16 or 18 carbon atoms. In the case where the polyglycerol esters are used in fat blends prone to graininess, the fatty acid residues are preferably therefore from palmitic acid.

The preferred source of the fatty acid moiety used in the synthesis of the polyglycerol esters consists preferably of fully saturated or fully hardened fatty acids or hardened triglycerides such as those stemming from lard, tallow, palm and the like.

Polyglycerol used in the fat compositions according to the invention can be obtained by thermal dehydration of glycerol at relatively high temperatures, e.g. 240° C., using an alkali as a catalyst.

The polyglycerol fatty acid esters can be prepared by esterification of a polyglycerol mixture with free $C_{16}$ or $C_{18}$ fatty acids or by interesterification, preferably random interesterification, of a polyglycerol mixture with triglycerides containing such saturated fatty acids and preferably triglycerides predominantly consisting of palmitic acid, e.g. having a level of 60–90% of palmitic acid residues, applying a method known per se, while ensuring that the high degree of esterification is achieved by selecting an appropriate molar ratio of triglyceride to polyglycerol.

Random interesterification can be carried out at high temperatures ranging from 100° to 250° C., using a catalyst such as alkali metals, their alkoxides or hydroxides under reduced pressure and substantially moisture-free conditions.

The present invention also relates to fat blends, particularly those useful for producing margarines and low-fat spreads having a reduced tendency to develop graininess and having improved butter-like properties. The margarine fats or fat blends according to the invention comprise:
(i) 0.1–10 wt% of the polyglycerol fatty acid ester composition defined above and
(ii) 99.9–90 wt% of a fat or fat blend which is prone to graininess.

If the fat blend comprises a fat component prone to graininess, the above-defined polyglycerol fatty acid ester composition will to a great extent help reduce development of graininess even under conditions which are very favourable to the formation of triglyceride conglomerates. Fats which potentially are very prone to graininess are particularly those in which the triglycerides satisfy the following requirements:

(a) $0.5 \leq SaUSa:SaSaU \leq 1.6$ (b) $Sa_3 \leq (SaUSa + SaSaU) - 7$, in which Sa stands for a saturated fatty acid; U stands for an unsaturated fatty acid; $Sa_3$ stands for a triglyceride derived from 3 saturated fatty acids, SaUSa is a symmetric triglyceride and SaSaU is an asymmetric triglyceride.

Polyglycerol fatty acid esters, when used in a concentration ranging from 0.5 to 3 wt.%, are particularly effective in reducing development of graininess.

Applicants have further found that the above-defined polyglycerol fatty acid esters were particularly useful for improving butter-like properties of margarine fat blends, especially when used at a level of 1 to 8 wt.% based on the total fat.

Margarines and low-fat spreads having a reduced tendency to graininess and improved butter-like properties can be produced from a fat blend comprising a fat containing at least one of the above-defined polyglycerol fatty acid esters.

Margarines and spreads can be produced using methods well known in the art, e.g. by emulsifying an aqueous phase in a fatty phase and subjecting the emulsion to cooling and working, for instance using a Votator or by churning of an oil-in-water emulsion.

The invention will now be illustrated in the following examples:

EXAMPLE 1

Preparation of polyglycerol

A polyglycerol mixture was prepared by subjecting glycerol to an alkali-catalysed thermal dehydration at 240° C.

The polyglycerol mixture obtained had the following composition:

Glycerol: 3.5%
Diglycerol: 41.4%
Triglycerol: 28.0%
Tetraglycerol: 12.6%
Pentaglycerol: 8.1%
Hexaglycerol: 3.4%
Heptaglycerol: 2.1%
Octaglycerol: 0.9%

Fully hardened palm oil (5800 parts by weight) and polyglycerol (1000 parts by weight) were fed to a reactor. The polyglycerol contained a sufficient amount of soap to act as interesterification catalyst. A vacuum of 100 Torr. was applied and the mixture was stirred and heated under pressure to a reaction temperature of 230° C. These reaction conditions were maintained for 3 hours using a reflux temperature of 80°-85° C.

During the last 10 minutes of the reaction, steam was replaced by carbon dioxide, the vacuum was discontinued and the material was cooled to 100° C. After 1 hour, 45 parts by weight of a 50% citric acid were added. The material was allowed to stand for 2 hours and the citric acid was separated. The fully esterified product was subsequently vacuum-dried and bleached.

The product had the following analytical values:

Saponification value: 190-200
Hydroxyl value: 0-20
Acid value: 0-10
Iodine value: 0-5
Soap: 0-1%
Moisture: 0-1%

Preparation of a margarine having improved butter-like properties

Margarine was prepared starting from an aqueous phase (16%) and a fat blend (84%) of the following composition:

31% of liquid vegetable oil (mixture of sunflower and soybean oil)
13% of rapeseed oil (hydrogenated to a melting point of 30° C.)
17% of palm oil
2% of palm oil (hydrogenated to an m.p. of 45° C.)
25% of soybean oil (hydrogenated to an m.p. of 36° C.)
12% of soybean oil (hydrogenated to an m.p. of 28° C.)

A second margarine was prepared starting from the same fat blend, but to which had been added: 8% of the polyglycerol ester prepared as above.

Both margarines were submitted to a panel of experts, who evaluated the product as to plasticity and butter-like properties. The results are shown in the Table below:

TABLE

| | Standard mixture | Standard mixture + polyglycerol ester |
|---|---|---|
| Plasticity | 2 | 4.5 |
| Butter-like properties | 4.5 | 7.5 |

The ratings were applied on the basis of the following scales:

Plasticity (scale 1-5)

1 = no plasticity
3 = moderate plasticity
5 = great plasticity (a value of 5 is given to butter)

Butter-like properties (scale 1-10)

6.5 = bad
6.5-7.0 = acceptable
7.0-7.5 = good
7.5 = very good (a value exceeding 7.5 is given to butter)

EXAMPLE 2

Two margarines were prepared, starting from an aqueous phase (16%) and fat blend (84%) consisting of 5% of sunflower oil and 95% of an olein obtained by dry fractionation (at 35° C.) of an interesterified mixture consisting of 80% of palm oil, 10% of slightly hardened soybean oil (m.p. 28° C.) and 10% of soybean oil hardened to a melting point of 36° C.

One of the margarines contained 1% of polyglycerol ester in which 90% of the fatty acid residues consisted of palmitic acid; the other margarine did not contain this compound.

Both margarines were stored for 4 weeks at 15° C. Under these conditions the development of graininess was promoted. The evaluation scale was 1-6. The margarines were evaluated as to graininess (microscopically).

1-2 = no graininess
3-4 = slight graininess
5-6 = large extent of graininess.

The results can be shown as follows:

| | Margarine without additive | Margarine + PG (1%) | Margarine + PG (0.5%) |
|---|---|---|---|
| Graininess | 4 | | 1 |

EXAMPLE 3

A margarine was produced from a fat blend consisting of 10% palm oil and 90% of a randomly interesterified mixture obtained from a mixture consisting of 45% palm oil and 55% soybean oil hydrogenated to a melting point of 28° C.

The percentage of SaUSa was 7.5.
The percentage of SaSaU was 6.
The ratio of SaUSa of SaSaU was 1.25.
The level of trisaturated glycerides $Sa_3$ was 3.7%.

Half of the quantity of margarine prepared was admixed with 0.3 wt% of a polyglycerol ester composition produced by interesterification of the polyglycerol described in Example 1 with palm oil to obtain an ester with an degree of esterification of 90%, whereby substantially all the fatty acid residues consisted of palmitic acid. The other half of the quantity of margarine produced did not contain any polyglycerol ester.

Both margarines were stored for 4 weeks at 15° C. On microscopic examination, the product according to the invention did not display graininess (score=1), whereas the comparative product did display graininess (score=5).

We claim:

1. A margarine fat or fat blend having a reduced tendency to develop graininess, comprising:
    (i) 0.1 to 10 wt% of polyglycerol fatty acid esters having the following structural features:
        (a) a polyglycerol moiety comprising
            50-100% of di-, tri- or tetraglycerol,
            0-40% of penta- or hexaglycerol, and
            0-10% of hexaglycerol or higher polymers;
        (b) fatty acid residues selected from those having 18 and 16 carbon atoms and mixtures thereof, having an iodine value that does not exceed 10;
        (c) a degree of esterification ranging from 80 to 100%; and
    (ii) 99.9 to 90 wt% of a fat or fat blend which upon storage will develop a perceivable graininess.

2. A margarine fat or fat blend according to claim 1 (ii) wherein the fat or fat blend comprises triglycerides satisfying the following requirements:
    (a) the ratio of SaUSa to SaSaU ranges from 0.5 to 1.6;
    (b) the level of saturated triglycerides is less than or equal to the sum of SaUSa and SaSaU less 7, wherein
    Sa stands for a saturated fatty acid,
    U stands for an unsaturated fatty acid,
    SaUSa is a symmetric triglyceride and SaSaU is an asymmetric triglyceride.

3. A margarine fat or fat blend according to claim 2, wherein the fat is selected from the group consisting of palm oil, hydrogenated palm oil, interesterified palm oil and fats obtained by fractionation of these oils.

4. A margarine fat or fat blend according to claim 1, comprising:
    (i) 0.5 to 3 wt% of the polyglycerol fatty acid ester composition and
    (ii) 99.5 to 97 wt% fat.

5. Margarines and low-fat spreads comprising an aqueous phase and a fat, wherein is incorporated polyglycerol fatty acid esters comprising the following structural features:
    (a) a polyglycerol moiety comprising
        50-100% of di-, tri- or tetraglycerol,
        0-40% of penta- or hexaglycerol, and 0-10% of hexaglycerol or higher polymers;
    (b) fatty acid residues selected from those having 18 and 16 carbon atoms and mixtures thereof, having an iodine value that does not exceed 10;
    (c) a degree of esterification ranging from 80 to 100%.

* * * * *